Sept. 12, 1961     E. A. SHINER ET AL     2,999,756
METHOD FOR PRODUCING CELLULOSIC SAUSAGE CASINGS AND PRODUCT
Filed June 22, 1959
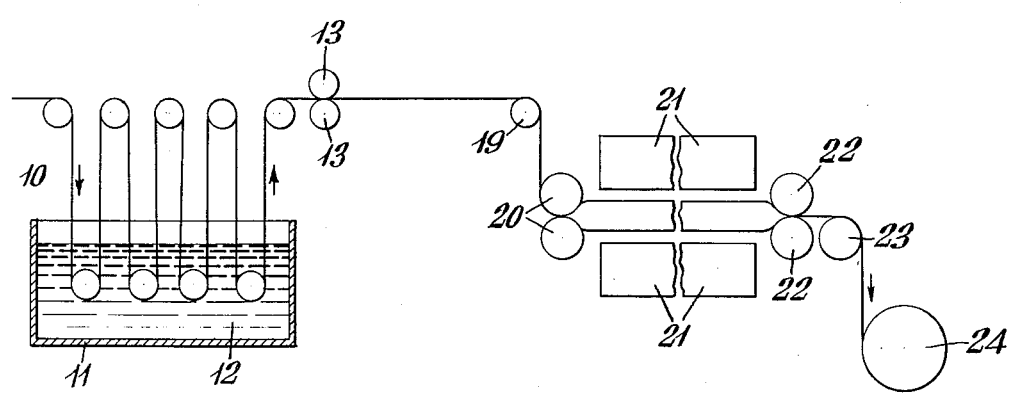
INVENTORS
EDWARD A. SHINER
CYRIL J. BROUNSTEIN
BY
ATTORNEY

United States Patent Office 2,999,756
Patented Sept. 12, 1961

2,999,756
METHOD FOR PRODUCING CELLULOSIC SAUSAGE CASINGS AND PRODUCT
Edward A. Shiner, Chicago, and Cyril J. Brounstein, Park Forest, Ill., assignors to Union Carbide Corporation, a corporation of New York
Filed June 22, 1959, Ser. No. 821,706
4 Claims. (Cl. 99—176)

This invention relates to artificial sausage casings and more particularly to the production of improved regenerated cellulose casings having predetermined circumferential expansion characteristics upon being stuffed with sausage meat or like food product.

Cellulosic sausage casings have been widely used in the processing of meat products such as bologna, Leona, New England, ham sausage, summer sausage, salami, and the like. In general, cellulosic casings for such use are applied to the sausage trade as flattened dried tubings of predetermined length and diameter. Prior to stuffing, one end of the casing is closed as by tying. The casing is then allowed to soak in water for about 30 minutes. The resultant wet, pliable casing is removed from the water bath and the open end of the casing is slipped over the stuffing horn of a stuffing machine. The wet casing is then filled with the meat emulsion which is extruded under pressure through the orifice of the stuffing horn and into the interior of the casing. The operator during filling of the casing circumferentially grips the open end of the casing about the stuffing horn whereby the meat emulsion is subjected to pressure within the casing and the latter is distended by the pressure exerted thereon by the meat emulsion. When the casing is filled and sufficiently distended, the open end portion is gathered and tied to form a compact, taut, stuffed casing. The meat product encased in the cellulose casing is thereafter cooked in hot water or hot air or hung in a smokehouse and smoked. The products are then cooled and refrigerated.

One type of casing conventionally supplied to the sausage trade required the operator to circumferentially distend and stretch the water-soaked casings 40% to 60% to reach the final desired circumference at internal stuffing pressures of about 150–175 mm. Hg. Inasmuch as most of the casing stretch occurred at internal pressures near the final stuffing pressure, such high pressures, coupled with the time required to hold the casing on the horn at this pressure to obtain the recommended stuffing circumference, caused considerable operator fatigue. In addition, size control of the stuffed casing was difficult since at the final pressures used in stuffing there was a large change in the casing's circumference with small changes in stuffing pressure, and moreover, the stuffed casings had a tendency to bulge, resulting in an exaggerated pear shape or football-shaped stuffed product.

Upon slicing such non-cylindrical products, the resultant slices varied in weight due to differences in cross-sectional area and thus were not wholly satisfactory for prepackaging by methods dependent upon uniform weight of each slice.

Other casings have been produced which have little or no stretch when stuffed and of a size that requires mere filling of the casing with very little internal pressure exerted by the meat product to expand the casing to the recommended circumference. Casings thus stuffed are not entirely satisfactory because they do not exert sufficient pressure on the meat to prevent emulsion breakdown during processing. Typically, a bologna emulsion containing high percentages of edible offal (i.e. 15% by weight based on the meat block) encased in a cellulosic casing requiring little or no stuffing pressure (50 mm. Hg or less) to obtain the recommended expanded circumference, forms during processing, unsightly fat and gelatin pockets within the meat mass, and are also visible on the external surface, and at the ends of the meat product. Attempts to stuff the meat emulsion in the casings at higher pressures to prevent emulsion breakdown will, depending upon the stretch characteristics of the casings at higher pressures, either result in an oversized casing in the case of a stretchable product or cause breakage due to excessive internal pressure in the case of a casing with limited stretch because there is no convenient means for the operator to gauge the internal pressure, such as by an easily detectable change in circumference as occurs with a highly stretchable type casing. Also, since the latter type casing has little stretch, the possibility of relieving some of the internal pressure by the stretch of the casing is not present.

Another problem associated with conventional casings requiring little stuffing pressure to reach the recommended stuffing circumference is the satisfactory application thereto of printed matter. In general casings are printed dry, i.e., less than 20% moisture content. The inks presently used for printing cellulose casings are essentially oleoresinous varnishes, based on drying oils. Casings which are printed with these inks and which are not subsequently stretched have reduced moisture vapor and smoke permeability in the printed area. This results in either emulsion breakdown or a variation in color of the meat product under the printed area. Stretching the casing after it has been printed with oleoresinous inks reduces or completely eliminates this effect.

Another problem associated with casings having little or no residual stretch under stuffing pressures is that the operator cannot readily produce desired small variations in the final size of the stuffed casing.

An object of this invention is to provide a method for producing an improved cellulosic sausage casing having predetermined expansion characteristics upon being rewet and stuffed.

Another object of this invention is to provide an improved cellulosic sausage casing which can be easily and readily filled with meat emulsion and results in a uniform, substantially cylindrical stuffed casing.

A further object is the production of regenerated cellulose sausage casing having an operator-recognizable, uniform, transverse stretch when subjected to stuffing pressures of the order of 100 to 175 mm. Hg pressure.

A further object is the production of regenerated cellulose sausage casing which is uniformly, transversely stretchable at stuffing pressures of the order of 100 to 175 mm. Hg pressure to form a substantially cylindrical stuffed casing.

A further object is the production of regenerated cellulose sausage casings having relatively small amounts of circumferential stretch when subjected to stuffing pressures of the order of 50 mm. Hg, but which do stretch uniformly in circumference an operator-visible amount when subjected to internal stuffing pressures of the order of 100 to 175 mm. Hg, said latter circumferential stretch not exceeding about 30% of the casing's circumferential dimension after the usual water-soaking step preliminary to stuffing.

Another object is the production of regenerated cellulose casings having a minimum number of breakages when subjected to conventional stuffing and meat processing conditions.

Additional objects will become apparent as the description of the invention proceeds.

According to the present invention, regenerated cellulose sausage casings highly resistant to breakage during stuffing and processing and optimum circumferential stretch characteristics under stuffing pressures are obtained by annularly extruding a viscose composition having a gamma number as hereinafter defined of at least about 34 and wherein the cellulose after regeneration has a degree of polymerization as measured by its cupriethylene diamine viscosity as hereinafter defined of at least 4.3 centipoises to form tubing, regenerating the cellulose in said tubing to form wet gel tubing by passage through one or more regenerating baths, water-washing the regenerated gel tubing, plasticizing the washed wet gel tubing with a polyhydric alcohol, thereafter drying the plasticized tubing while inflated by a suitable gas, such as air, under sufficient pressure to cause the plasticized gel tubing to expand circumferentially from about 15% to 23% and while subjected to linear tension as by rolls or equivalent pulling means in the dryer apparatus to stretch the tubing linearly from about 2% to 8%.

As schematically illustrated in FIGURE 1, flattened, tubular, cellulosic sausage casing 10 after being formed and washed is glycerinated in its passage through tub 11 containing a glycerin-water solution 12. The rate of travel through tub 11 and the concentration and temperature of the glycerine-water solution 12 determine the percentage of glycerine absorbed by the casing. This procedure is well known in the art.

Following glycerination, the tubing passes through squeeze rollers 13 which minimize any solution carry over. The tubing then passes over guide roller 19, through squeeze rollers 20 and into heating chamber 21 wherein it is dried to the proper moisture content. The casing is inflated by a bubble of air maintained in a relatively fixed position between squeeze rollers 20 and 22 by the sealing action of rollers 20 and 22. After the casing leaves heating chamber 21, it passes between squeeze rollers 22, then over guide roller 23 and is wound upon reel 24.

The bubble of air maintained at a suitable pressure between the two sets of squeeze rollers 20 and 22 is used to distend and stretch the tubing transversely. The exit squeeze rollers 22 are driven at a greater peripheral speed than the entrance squeeze rollers 20 to pick up any slack formed during the stretching and to impart some longitudinal stretch.

It has been found that the stretch characteristics for optimum performance of the casings for processing meat emulsions is attained when the total circumferential or transverse stretch of the casing from gel tubing to stuffed casing is from 40% to 45%, based on the gel tubing circumference, with about 15% to 23%, and optimumly 20% of the transverse stretch imparted to the tubing in the drying step in producing the casing and the remaining transverse stretch imparted at internal stuffing pressures of from about 50 to 175 mm. Hg.

It is to be noted that the circumference of the rewet casings of this invention at internal stuffing pressures of about 50 mm. Hg approximate the circumference of the dry casing. This internal pressure is not sufficient to prevent emulsion breakdown when high offal content sausage emulsion is used, even though the casing stuffed with a sausage emulsion at 50 mm. Hg internal pressure is generally wrinkle-free and snug.

The dry casings of this invention which have been transversely stretched about 20% during drying based on the gel tubing circumference can be stretched transversely about 15% to 25% and optimumly 16% to 21%, based on the dry casing circumference, when rewet and subjected to internal stuffing pressures of from 100 to 175 mm. Hg. Preferably the change in circumference with change in internal pressure from 100 to 175 mm. Hg will be in the range of 0.015 to 0.041 inch per mm. Hg internal pressure.

The change in circumference with change in internal pressure at internal pressures of from 100 to 175 mm. Hg is large enough so that it can be readily detected by the sausage operator so as not to exceed the desired internal pressure and cause the casing to break, yet small enough to allow uniform and ready control of size.

Casings for the sausage trade are sold in various lengths and diameters. In order to maintain the same margin of safety against bursting for all diameters, the thickness of the casing must be increased with the larger diameter. The thickness of the casing therefore varies with the size.

For ease of manufacturing control, the thickness of the casing is controlled by the weight of cellulose in the dried casing per 100 foot length. This is called the bone dry gauge or B.D.G. The B.D.G. of the casing will also vary with the size of the casing as does the thickness. The B.D.G. can be calculated according to the standard pipe formula (Piping Handbook, S. Croker, p. 33, McGraw-Hill Publishing Co., New York, 1945), from which is derived the following formula:

$$\frac{(D_a)^2}{(B.D.G.)_a} = \frac{(D_b)^2}{(B.D.G.)_b}$$

where $D_a$ is the recommended stuffing diameter and $(B.D.G.)_a$ is the bone dry gauge of casing $a$, and $D_b$ is the recommended stuffing diameter and $(B.D.G.)_b$ is the bone dry gauge of casing $b$.

On the basis of field performance tests, the bone dry gauge or B.D.G. for a casing having a recommended stuffing circumference of 15.0 inches (diameter—4.77 inches) is optimumly 780–960 grams of cellulose per 100 foot length. This bone dry gauge coupled with the stretch characteristics hereinbefore set forth results in a casing of minimum breakage during stuffing and filled with meat emulsion to yield substantially cylindrical stuffed products of uniform size having minimum emulsion breakdown. Since casing thickness required for optimum performance can be reduced with reduced size of casing, it is preferred that the bone dry gauge of the casing be in the range shown by the formula:

$$B.D.A. = (D_a)^2 (34.3 \text{ to } 42.3)$$

where $(D_a)$ is the recommended stuffing diameter of the casing and B.D.G. is the bone dry gauge of the casing. (Formula derived from range of B.D.G. and diameter of 15 inch casing.)

In the stuffing of the casing with meat emulsion, an average internal pressure of about 100–175 mm. Hg at the recommended stuffing circumference coupled with the stretch characteristics herein described will require a minimum effort on the part of the stuffing operator to fill the casing while insuring sufficient compacting of the meat emulsion to minimize emulsion breakdown.

The circumference of wet gel tubing, the amount of stretch imparted during the drying stage, and the thickness of the casing are all critical factors affecting the stretch characteristics of the casing.

The transverse stretch imparted to the tubing during the drying step primarily influences the circumference attained of the rewet casings at internal pressures below about 100 mm. Hg. The greater the transverse stretch imparted during drying, the smaller the change in circumference with change in stuffing pressure.

Reducing the circumference of the gel tubing results in correspondingly reduced stretched circumference at all internal stuffing pressures.

The casing thickness as measured by casing gauge (i.e. weight per unit length) primarily influences the casing's developed circumferences at 150 mm. Hg and higher internal pressures. The greater the gauge, the smaller the developed circumference.

Machine direction or longitudinal dryer stretch influences the residual stretch in the longitudinal direction. It is preferred that the machine direction dryer stretch be in the range of 2% to 8%. Less than 2% stretch results in difficulty in producing the casing due to slack buildup in the drier. Increased longitudinal stretch results in reduced volumetric capacity of the stuffed casings because of the reduced residual stretch in the longitudinal direction. Over 8% longitudinal stretch imparted during drying reduces the margin of safety against breakage in terms of ability of the casings to elongate in the longitudinal direction to relieve internal pressures developed during processing.

The casings of the invention, when stuffed with meat emulsion and expanded under internal stuffing pressures of 100 to 175 mm. Hg form a substantially cylindrical product as contrasted to the oval-shaped products heretofore produced. This substantially cylindrical product is ideally suited for producing sausage or meat products that are to be sliced and prepackaged as unit weight items. Since the slices will be of uniform cross section, average unit weight per package can be readily attained with the same number of slices.

The gamma number of the viscose at the time of coagulation and regeneration of the viscose tubing is critical. The gamma number is the number of xanthate sulfur groups per 100 anhydroglycose units and is obtained by the method described in Industrial and Engineering Chemistry, vol. 17, page 624 (1945). Cellulosic casings made according to the method of this invention from viscoses having gamma numbers below about 34 had greater stuffing breakage than casings made from viscoses having gamma numbers above 34, such as 34 to 50. Viscoses having gamma numbers above about 50 cannot be readily coagulated and regenerated without blistering occurring in the tubing when extruded into an aqueous sodium sulfate-sulfuric acid bath at 30° C.–50° C.

The effect of the gamma number of the viscose on casing breakage during stuffing operations can be readily seen from the following comparative test wherein casings were made under similar conditions except for variations in gamma number of the viscose at the time of extrusion into the coagulating bath. The casings were all stuffed and processed under the same conditions and with the same bologna emulsion.

TABLE I

| Viscose Gamma Number | C.E.D. Viscosity of casing | Percent Casing Breakage in Stuffing |
|---|---|---|
| 31.3 | 4.4 | 4.8 |
| 36.7 | 4.4 | 1.8 |
| 37.0 | 4.4 | 1.2 |

As mentioned heretofore, the degree of polymerization of the cellulose in the regenerated casing as measured by its cupriethylene diamine viscosity is preferably maintained above 4.3 centipoises. High alpha cellulose wood pulps and loose linter cotton can be used as the source of cellulose. The initial degree of polymerization of the cellulose, the extent of the aging of alkali cellulose, and the technique of xanthation in the preparation of the viscose are the primary factors which determine the degree of polymerization of the regenerated cellulose tubing. This can be readily determined empirically by those skilled in the art.

The cupriethylene diamine viscosity, hereinafter referred to C.E.D. viscosity is used as a measure of the degree of polymerization of the cellulose. TAPPI test method T–230–sm–50 describes the details of the method which is essentially that of measuring the viscosity of a solution containing 0.5% by weight cellulose dissolved in a cupriethylene diamine solution which is 0.5 molar in copper.

Cellulose casings having C.E.D. viscosities lower than about 4.3 centipoises do not perform as well as similar casings having C.E.D. viscosities of about 4.3 centipoises and above.

This can readily be seen from the following comparative test wherein similar casings were stuffed with bologna emulsion and processed. Only the C.E.D. viscosity of the tubing was varied.

TABLE II

| Viscose Gamma Number | C.E.D. Viscosity of Casing | Percent Casing Breakage in Stuffing |
|---|---|---|
| 37 | 4.35 | 2.0 |
| 37 | 3.82 | 4.0 |

The casing after regeneration and washing can be plasticized or softened by passing it through an aqueous glycerine or glycol bath. The desired plasticizer content can be readily obtained by those skilled in the art by correlating the concentration of glycerine or glycol in the bath with the exposure time, all of which are well known. Preferably, the casing (dry basis) is plasticized with from 15% to 25% by weight of glycerine.

The aqueous viscose compositions preferably contain from 6% to 8.5% by weight of cellulose and 5% to 8% by weight of sodium hydroxide. For optimum results it is preferred to extrude such viscoses into an aqueous coagulating bath containing at least 15% by weight sodium sulfate and at least 5% by weight sulfuric acid at bath temperatures of about 30° C. to 50° C.

The invention is further illustrated in the following embodiments, but is not to be construed as limited thereto other than as set forth in the appended claims.

*Examples 1 to 8*

Regenerated cellulose tubular casings were made from a viscose composition of 7% by weight cellulose, 6% by weight NaOH, and a gamma number of 36. The viscose was extruded through annular orifices of suitable sizes to form casings of desired diameters and then into an aqueous coagulating bath containing 15% by weight sodium sulfate and 10% by weight sulfuric acid (bath temperature 40° C.), regenerated, and washed according to conventional procedures well known to those skilled in the art, such as is disclosed in Henderson, U.S. Patent 1,601,686. The regenerated cellulose tubings were then plasticized by passing them through an aqueous glycerine solution. The plasticized regenerated cellulose tubings containing 20% by weight glycerine, based on total dry weight of glycerine and cellulose, herein called gel tubing (never dried), were passed into a hot air dryer of the type disclosed by A. G. Hewitt in U.S. Patent 1,967,773, which comprises a heating tunnel having a set of squeeze rollers at the entrance end and another set at the exit end of the dryer. A bubble of air was maintained under sufficient pressure within the tubing between the two sets of squeeze rollers to distend and stretch the tubing transversely. The exit squeeze rollers were driven at a greater peripheral speed than the entrance squeeze rollers to pick up any slack formed during the stretching and to impart a desired amount of longitudinal stretch. The machine or linear direction stretch imparted during drying was 4%, and the tubings were stretched transversely so that the dry casing was 20% greater in circumference than the gel tubing. All the dried casings of Examples 1 to 8 had a C.E.D. viscosity of 4.4 centipoises.

As employed in the tabulated data of Examples 1 to 8 set forth in subsequent Table III, the term "gel tubing" refers to the regenerated cellulose casing which has not been dried after regeneration, the term "dried casing" generally refers to regenerated gel tubing that has been dried to a moisture content of less than about 20% and preferably between 3% and 12%, the term "rewet casing" refers to dried casing that has been soaked in water until saturated prior to stuffing, the term "recommended stuffed circumference" refers to stuffing circumference in sausage production consistent with optimum performance of the casings during stuffing with meat emulsion at stuffing pressures of 100 to 175 mm. Hg, and the term "bone dry" gauge is the weight of cellulose in grams of a 100 foot length of the casing or tubing.

Table III

| Examples | 1 | 2 | 3 | 4 | 5 | 6 | 7 | 8 |
|---|---|---|---|---|---|---|---|---|
| Gel tubing circumference inches | 4.5 | 5.3 | 5.9 | 6.7 | 7.6 | 8.7 | 9.6 | 10.5 |
| Dried casing circumference do | 5.4 | 6.3 | 7.0 | 8.1 | 9.2 | 10.5 | 11.6 | 12.6 |
| Moisture content of dried casing (percent by weight) percent | 7 | 7 | 7 | 7 | 7 | 7 | 7 | 7 |
| Casing wall thickness of dried casing in mils | 1.7 | 1.9 | 2.1 | 2.5 | 2.8 | 3.0 | 3.3 | 3.8 |
| Bone dry gauge | 168 | 219 | 282 | 369 | 471 | 606 | 714 | 870 |
| Circumference of rewet casing at atmospheric pressure inches | 5.1 | 6.0 | 6.8 | 7.8 | 8.9 | 10.2 | 11.1 | 12.3 |
| Circumference of rewet casing at internal pressure of 50 mm. Hg inches | 5.15 | 6.16 | 6.97 | 8.05 | 9.24 | 10.45 | 11.6 | 12.85 |
| Circumference of rewet casing at internal pressure of 100 mm. Hg inches | 5.72 | 6.73 | 7.62 | 8.76 | 10.0 | 11.48 | 12.58 | 13.9 |
| Circumference of rewet casing at internal pressure of 150 mm. Hg inches | 6.62 | 7.88 | 8.7 | 10.1 | 11.15 | 12.9 | 14.1 | 15.65 |
| Recommended stuffed circumference do | 6.5 | 7.5 | 8.5 | 9.75 | 11.0 | 12.5 | 13.5 | 15.0 |

The data in Table III demonstrates that the dried casings of the present invention exhibit only slight circumferential shrinkage when soaked in water and therefore retain substantially all of the stretch imparted in drying. Since the internal circumference of the casing is larger therefore than that of the prior art casings and the circumference remains larger at internal pressures below that at which the casing reaches the desired circumference, it can be seen that the casings will be more rapidly filled than the prior art casings.

Table III also shows that at stuffing pressures of up to about 50 mm. Hg the casings of the invention had circumferential stretch of only on the order of about 5% or less, but at stuffing pressures above 50 mm. Hg and particularly between 100 and 150 mm. Hg an operator recognizable change in circumferential stretch of the order of about 15%, more or less, takes place. This makes it possible for the operator to control product size and, as previously pointed out, it is highly desirable that the meat emulsion be stuffed in the casings at these higher pressures to avoid gelation and fat pocket development during subsequent smoking and/or cooking processing of the meat emulsion.

What is claimed is:

1. Method for producing tubular sausage casings of regenerated cellulose, the steps which comprise annularly extruding a viscose having a gamma number between 34 and 50 to form a tubular product, coagulating and regenerating the tubing to form gel tubing, washing the gel tubing, plasticizing the gel tubing with a polyhydric alcohol, simultaneously drying and stretching linearly and transversely the plasticized gel tubing, said stretching being within the range of 15% to 23% in the transverse direction and 2% to 8% in the longitudinal direction, and maintaining the casing wall thickness within a range corresponding to the formula:

$$B.D.G. = (D_a)^2 (34.3 \text{ to } 42.3)$$

wherein B.D.G. is the bone dry gauge weight of cellulose in a 100 foot length of dried casing and $D_a$ is the recommended stuffing diameter of the casing in inches reached by internal stuffing pressures of 100 to 150 mm. Hg, said viscose after regeneration and coagulation yielding a regenerated cellulose having a degree of polymerization corresponding to a viscosity of at least 4.3 centipoise according to TAPPI test method T-203-cm-50.

2. Method for producing tubular sausage casings of regenerated cellulose, the steps which comprise annularly extruding a viscose having a gamma number between 34 and 50 to form a tubular product, coagulating and regenerating the tubing to form gel tubing, washing the gel tubing, plasticizing the gel tubing with a polyhydric alcohol, simultaneously drying and stretching linearly and transversely the plasticized gel tubing, said stretching being 20% in the transverse direction and 2% to 8% in the longitudinal direction and maintaining the casing wall thickness within a range corresponding to the formula:

$$B.D.G. = (D_a)^2 (34.3 \text{ to } 42.3)$$

wherein B.D.G. is the bone dry gauge weight of cellulose in a 100 foot length of dried casing and $D_a$ is the recommended stuffing diameter in inches reached at internal stuffing pressures of 100 to 150 mm. Hg, said viscose after coagulation and regeneration yielding a regenerated cellulose having a degree of polymerization corresponding to a viscosity of at least 4.3 centipoises according to TAPPI test method T-230-sm-50.

3. A regenerated cellulose sausage casing adapted to be stuffed as individual casing to form individual sausage units which sausage casing is thoroughly wetted prior to stuffing to such an extent as to permit said stuffing operation to substantially expand said casing 15 to 25 percent to a predetermined extent sufficient to produce a relatively taut, wrinkle-free sausage casing; said stuffed casing diameter being larger than the diameter of said casing prior to stuffing; said sausage casing having been extruded from a regeneratable cellulose derivative, regenerated, and then washed and plasticized to form gel cellulosic casing; said gel casing having been stretched during drying thereof 15% to 23% in the transverse direction and 2% to 8% in the longitudinal direction to form a dry casing having: a bone dry gauge of $(D_a)^2(34.2 \text{ to } 42.3)$ grams of cellulose per 100 foot length of dried casing, $D_a$ being the recommended stuffing diameter of said casing in inches reached at internal stuffing pressures of 100 to 150 mm. Hg; a viscosity of at least 4.3 centipoise when dissolved in cupriethylenediamine solution 0.5 molar in copper, according to TAPPI test method T-230-sm-50; and a circumferential stretch in the range of 0.015 to 0.041 inch per mm. Hg internal pressure at pressures of 100 to 175 mm. of Hg.

4. A regenerated cellulosic sausage casing as defined in claim 3, wherein said regeneratable cellulose is viscose having a gamma number of at least 34.

References Cited in the file of this patent

UNITED STATES PATENTS

| | | |
|---|---|---|
| 1,612,509 | Henderson et al. | Dec. 28, 1926 |
| 2,000,835 | Goldberger | May 7, 1935 |
| 2,043,172 | Hewitt | June 2, 1936 |
| 2,271,932 | Atkinson | Feb. 3, 1942 |
| 2,401,773 | Reichel et al. | June 11, 1946 |
| 2,401,798 | Reichel | June 11, 1946 |
| 2,634,459 | Irons | Apr. 14, 1953 |
| 2,699,983 | Drisch et al. | Jan. 18, 1955 |
| 2,845,357 | Milne | July 29, 1958 |
| 2,866,710 | Dowd et al. | Dec. 30, 1958 |

FOREIGN PATENTS

| | | |
|---|---|---|
| 319,771 | Great Britain | Aug. 21, 1930 |

OTHER REFERENCES

"Cellulose and Cellulose Derivatives," by Ott, 1943, Interscience Publishers, Inc., New York, page 821.

UNITED STATES PATENT OFFICE
CERTIFICATE OF CORRECTION

Patent No. 2,999,756                                         September 12, 1961

Edward A. Shiner et al.

It is hereby certified that error appears in the above numbered patent requiring correction and that the said Letters Patent should read as corrected below.

Column 4, line 35, for "B.D.A.=$(D_a)^2$(34.3 to 42.3)" read -- B.D.G.=$(D_a)^2$(34.3 to 42.3) --; column 7, line 63, for "T-203-cm-50" read -- T-203-sm-50 --.

Signed and sealed this 1st day of January 1963.

(SEAL)
Attest:

ERNEST W. SWIDER                                        DAVID L. LADD
Attesting Officer                                          Commissioner of Patents